(12) United States Patent
Clarkson et al.

(10) Patent No.: US 8,905,348 B2
(45) Date of Patent: Dec. 9, 2014

(54) FAN CASE DRAINAGE SYSTEM

(75) Inventors: Steven Clarkson, Cheshire, CT (US); Thomas J. Robertson, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 264 days.

(21) Appl. No.: 13/613,240

(22) Filed: Sep. 13, 2012

(65) Prior Publication Data

US 2014/0069535 A1 Mar. 13, 2014

(51) Int. Cl.
*B64B 1/24* (2006.01)

(52) U.S. Cl.
USPC .................. 244/53 R; 244/136; 60/39.094

(58) Field of Classification Search
USPC ................. 244/53 R, 129.1, 136; 60/39.091, 60/39.094, 226.1; 220/571, 573, 601
See application file for complete search history.

(56) References Cited

U.S. PATENT DOCUMENTS

| | | | |
|---|---|---|---|
| 3,371,482 A * | 3/1968 | Camboulive et al. ........... | 60/796 |
| 5,054,282 A | 10/1991 | Costa et al. | |
| 5,095,617 A | 3/1992 | Costa et al. | |
| 5,285,636 A | 2/1994 | Mayo et al. | |
| 8,261,530 B2 | 9/2012 | Hendricks | |
| 2006/0249628 A1 | 11/2006 | Turner et al. | |
| 2008/0063517 A1 | 3/2008 | Barnett | |
| 2008/0181770 A1 | 7/2008 | Russell | |
| 2008/0190091 A1 | 8/2008 | Peters et al. | |
| 2009/0133376 A1 | 5/2009 | Zysman | |
| 2010/0293917 A1 | 11/2010 | Handley et al. | |
| 2011/0133035 A1 | 6/2011 | Vauchel et al. | |
| 2012/0090693 A1 | 4/2012 | Chelin et al. | |

FOREIGN PATENT DOCUMENTS

WO 2012116739 A1 9/2012

OTHER PUBLICATIONS

International Search Report and Written Opinion for International Application No. PCT/US2013/059692 completed on Dec. 6, 2013.

* cited by examiner

*Primary Examiner* — Tien Dinh
*Assistant Examiner* — Nicholas McFall
(74) *Attorney, Agent, or Firm* — Carlson, Gaskey & Olds P.C.

(57) ABSTRACT

A casing for installation in more than one circumferential position, includes a shell into which fluid may drain, a pre-installation bottom dead center of the shell, a first post-installation bottom dead center of the shell wherein the first post-installation bottom dead center of the shell is circumferentially rotated a first number of degrees in a first direction from the pre-installation bottom dead center of the shell. The non-limiting embodiment further discloses a first ramp disposed between the first post-installation bottom dead center of the shell and the pre-installation bottom dead center of the shell for directing fluid from the first post-installation bottom dead center of the shell to the pre-installation bottom dead center of the shell.

19 Claims, 2 Drawing Sheets

FAN CASE DRAINAGE SYSTEM

BACKGROUND

Conventional turbine and turbofan engines for aircraft include a plurality of fan blades that rotate within a duct commonly known as a fan case. The fan case serves as a protective covering to protect the fan blades and the aircraft. Further, the fan case channels airflow into the turbine engine. The inner surface of the fan case is constructed to withstand impacts from objects that may come into contact with the fan case, broken fan blades and includes acoustical features to reduce noise emitted from the engine.

The acoustical features include a layer of noise attenuation structures covered by a protective face layer including a plurality of openings. The face layer is typically a thin sheet of metal or composite material mounted over the noise attenuation structure. Noise causing pressure disturbances emanate through the openings within the face layer into the noise attenuation structure where the pressure disturbances dissipate to reduce the total amount of noise.

Water may leak into the fan casing through the face layer and the noise attenuation structure.

SUMMARY

According to an non-limiting embodiment disclosed herein, a casing for installation in more than one circumferential position, includes a shell into which fluid may drain, a pre-installation bottom dead center of the shell, a first post-installation bottom dead center of the shell wherein the first post-installation bottom dead center of the shell is circumferentially rotated a first number of degrees in a first direction from the pre-installation bottom dead center of the shell. The non-limiting embodiment further discloses a first ramp disposed between the first post-installation bottom dead center of the shell and the pre-installation bottom dead center of the shell for directing fluid from the first post-installation bottom dead center of the shell to the pre-installation bottom dead center of the shell.

According to any claim preceding this claim, the casing includes a drain disposed at the pre-installation bottom dead center of the shell.

According to any claim preceding this claim, the casing includes a second post-installation bottom dead center of the shell wherein the second post-installation bottom dead center of the shell is circumferentially rotated a second number of degrees in a second direction from the pre-installation bottom dead center of the shell and, a second ramp disposed between a second post-installation bottom dead center of the shell and the pre-installation bottom dead center of the shell for directing fluid from the second post-installation bottom dead center of the shell to the pre-installation bottom dead center of the shell.

According to any claim preceding this claim, the first number of degrees and the second number of degrees are equal.

According to any claim preceding this claim, the first number of degrees equals the wing dihedral angle of an aircraft.

According to any claim preceding this claim, the first ramp extends beyond the first post-installation bottom dead center to a strut extending from the shell.

According to a further non-limiting embodiment disclosed herein, an engine for mounting on more than one position of an aircraft, includes a nacelle into which fluid may drain, a pre-installation bottom dead center of the nacelle, a first post-installation bottom dead center of the nacelle wherein the first post-installation bottom dead center of the nacelle is circumferentially rotated a first number of degrees in a first direction from the pre-installation bottom dead center of the nacelle. The further non-limiting embodiment further includes a first ramp disposed between the first post-installation bottom dead center of the nacelle and the pre-installation bottom dead center of the nacelle for directing fluid from the first post-installation bottom dead center of the nacelle to the pre-installation bottom dead center of the nacelle wherein the engine is mounted on a first wing.

According to any claim preceding this claim, the casing has a drain disposed at the pre-installation bottom dead center of the nacelle.

According to any claim preceding this claim, the casing has a second post-installation bottom dead center of the nacelle wherein the second post-installation bottom dead center of the nacelle is circumferentially rotated a second number of degrees in a second direction from the pre-installation bottom dead center of the nacelle, and a second ramp disposed between a second post-installation bottom dead center of the shell and the pre-installation bottom dead center of the shell for directing fluid from the second post-installation bottom dead center of the shell to the pre-installation bottom dead center of the shell wherein the engine is mounted on a second wing.

According to any claim preceding this claim, the first number of degrees and the second number of degrees are equal.

According to any claim preceding this claim, the first number of degrees equals the wing dihedral angle of an aircraft.

According to any claim preceding this claim, the first ramp extends beyond the first post-installation bottom dead center to a strut extending from the nacelle.

According to a further non-limiting embodiment disclosed herein, a nacelle for an engine mounted on more than one position of an aircraft includes a shell into which fluid may drain, a pre-installation bottom dead center of the nacelle, and a first post-installation bottom dead center of the shell wherein the first post-installation bottom dead center of the shell is circumferentially rotated a first number of degrees in a first direction from the pre-installation bottom dead center of the shell. The further non-limiting embodiment further includes a first ramp disposed between the first post-installation bottom dead center of the nacelle and the pre-installation bottom dead center of the nacelle for directing fluid from the first post-installation bottom dead center of the nacelle to the pre-installation bottom dead center of the nacelle, a second ramp disposed between a second post-installation bottom dead center of the shell and the pre-installation bottom dead center of the shell for directing fluid from the second post-installation bottom dead center of the shell to the pre-installation bottom dead center of the shell wherein the second post-installation bottom dead center of the nacelle is circumferentially rotated a second number of degrees in a second direction from the pre-installation bottom dead center of the nacelle, and a drain disposed at the pre-installation bottom dead center of the nacelle for draining the fluid.

According to any claim preceding this claim, the drain is disposed within a groove in a material extending radially inwardly from the shell.

According to any claim preceding this claim, the nacelle further includes a rub strip extending radially inwardly away from the shell and forward of the material wherein a first trough exists in the shell between the post-installation bottom dead center and the pre-installation bottom dead center wherein the first ramp fills the trough.

According to any claim preceding this claim, the first number of degrees equals the wing dihedral angle of an aircraft.

According to any claim preceding this claim, the first ramp extends beyond the first post-installation bottom dead center to a strut extending from the shell.

According to any claim preceding this claim, the drain is disposed between the first ramp and the second ramp.

According to any claim preceding this claim, the drain is disposed at the pre-installation bottom dead center.

DESCRIPTION

Figure 1:
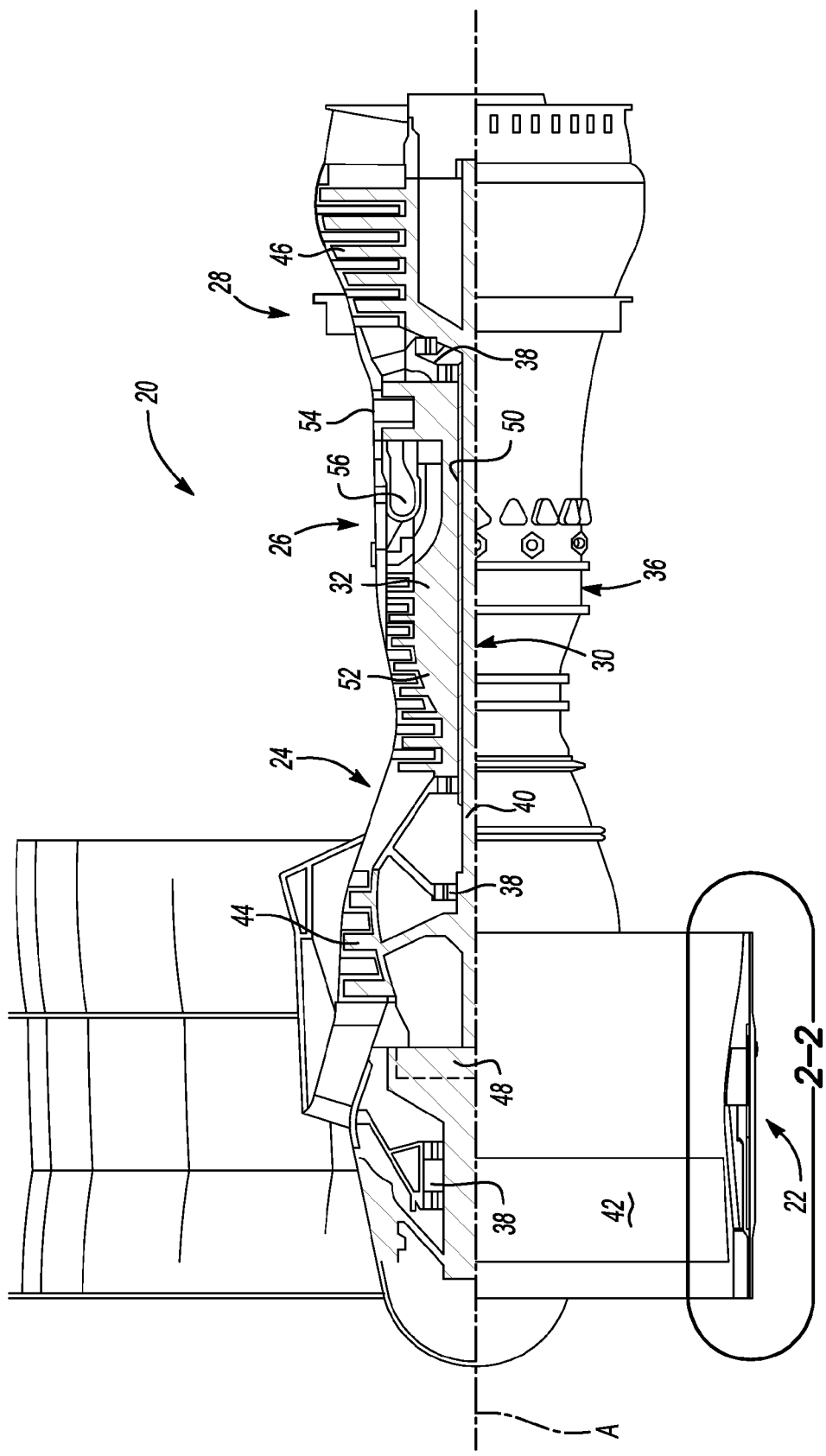
FIG. 1 shows a partially cut-away gas turbine engine having a fan case.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path while the compressor section 24 drives air along a core flow path for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan blade 42, a first compressor 44 and a first turbine 46. The first shaft 40 is connected to the fan blade 42 through a gear assembly of a fan drive gear system 48 to drive the fan blade 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclical gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan blade 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition —typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of [(T ambient degrees Rankine)/518.7)^0.5]. The "Low corrected fan tip speed" as disclosed herein according to one non-limiting embodiment is less than about 1150 feet per second.

Figure 2:
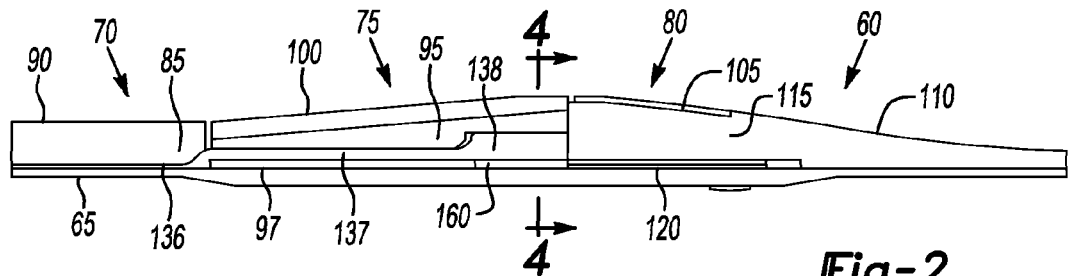
FIG. 2 shows a sectional portion of a fan casing of the gas turbine engine of FIG. 1 taken along the lines 2-2.

Referring now to FIG. 2, a cross-section of fan case assembly 60 taken along the lines 2-2 of FIG. 1 is shown. The fan case assembly includes nacelle 65 (e.g., a shell), a forward liner section 70, fan section 75, and an aft liner section 80. The forward liner section 70 includes a first noise attenuation portion 85, typically made of aluminum honeycomb, which is covered by a perforated face sheet 90. Water (or other fluid) may leak through the first noise attenuation portion 85 and the perforated face sheet 90.

The fan section 75 is aft of the forward liner section 70, and includes a second noise attenuation portion 95 that is covered radially inwardly by an abradable strip 100 that is adjacent a fan blade 42. The abradable strip 100 includes a structure and material that endures limited contact with the fan blade 42 to protect both the fan blade 42 and the fan case assembly 60. Radially outwardly from the second noise attenuation portion 95 and the strip 100, a ballistic plate 97, typically a para-aramid synthetic fiber, or the like, is mounted to the nacelle 65. Water may leak through the second noise attenuation portion 95.

The aft liner section 80 is aft of the fan section 75. The radially innermost layers of the aft liner section 80 include a protective covering 105 protects the fan case assembly 60 against possible impacts from debris including ice (not shown) and another perforated face sheet 110 aft of the protective covering 105. Both the protective covering 105 and the face sheet 110 attach to a third noise attenuation portion 115. A drain 120 is disposed radially outwardly of the protective covering 105 and the face sheet 110 and is disposed in a groove 125 at a radially distal end 130 of the third noise attenuation portion 115 (see FIG. 4). It is generally desirable to have the drain 120 at the bottom dead center ("BDC") of the engine 20 before and after assembly in an aircraft 135 (See FIG. 3) or other installation as will be discussed herein.

Water may flow or pool in a first area 136 beneath (i.e., radially outwardly of) the first noise attenuation portion 85, in a second area 137, aft of the first area 136, beneath (i.e., radially outwardly of) the second noise attenuation portion 95 and above the ballistic plate 97 and against the nacelle, and in a third area 138, aft of the second area 137, beneath (i.e., radially outwardly of) the second noise attenuation portion 95 and forward of the third noise attenuation portion 115 and against the nacelle 65. The areas 136-138 are exaggerated for ease of illustration and may vary in area due to operation tolerances and expansion or contraction during operation. It is desirable to remove such water.

Figure 3:
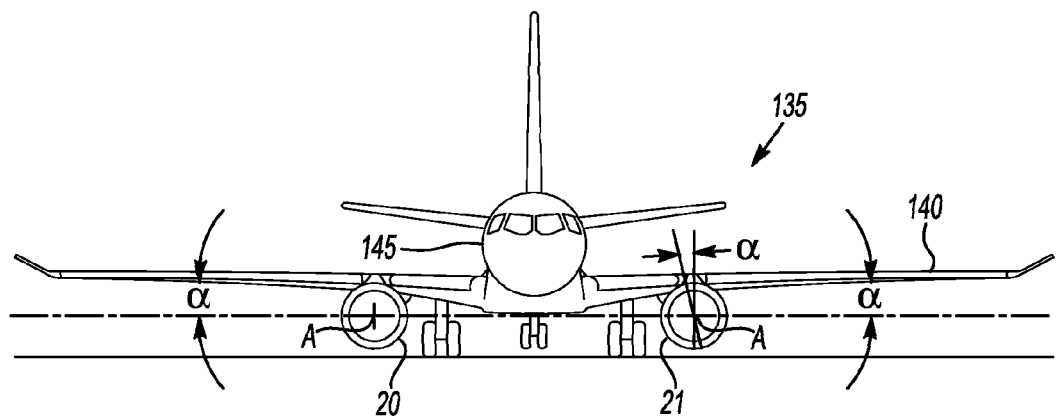
FIG. 3 shows an aircraft in which the gas turbine engine of FIG. 1 is used.

Referring now to FIG. 3, the aircraft 135 in which engines 20, 21 may be disposed is shown. The aircraft has a pair of wings 140 each of which holds an engine 20 or 21 that is conventionally attached perpendicularly to each wing 140. Because the wings 140 extend upwardly from the fuselage 145 at a dihedral angle a and because the engines 20, 21 are attached perpendicularly to the wings 140, what was BDC for the engines 20, 21 before installation is no longer BDC after installation by the same number of degrees as the angle a representing the dihedral angle of the wings 140. For instance, pre-installation BDC (BDC-PRE—See FIG. 4) for engine 20 rotates about a degrees clockwise about axis A and a first post-installation BDC (BDC-POST—See FIG. 4) is defined. Similarly, pre-installation BDC for engine 21 rotates about a degrees counter-clockwise about axis A and a second post-installation BDC (BDC-POST—See FIG. 4) is defined.

Figure 4:
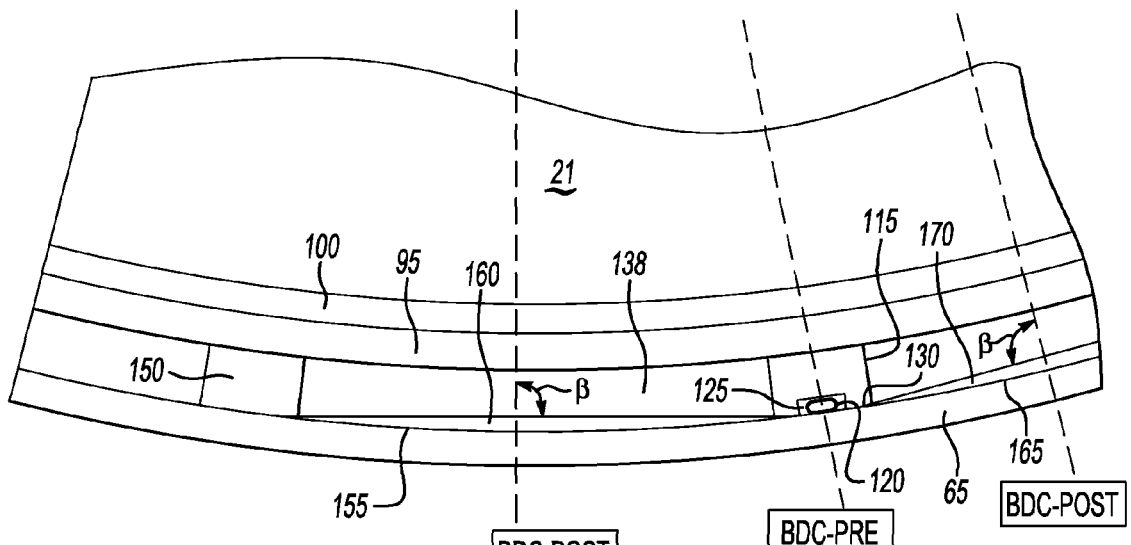
FIG. 4 shows a cut-away view of the fan casing taken along the lines 4-4 of FIG. 2.

Referring now to FIG. 4, a front cross-section of the fan case assembly 60 of FIG. 2 relating to engine 21 in which the third area 138 facing aft is shown. The nacelle 65 attaches to the third noise attenuation portion 115 by a strut 150. The drain 120 is disposed in the groove 125 in the radially distal end 130 of the third noise attenuation portion 115. The drain 120 is placed at BDC-PRE of the engine 21 before the engine 21 is attached to the wing 140 and does not take into account the dihedral angle a and therefore the drain in not at BDC-PRE after attachment to the wing 140. BDC after attachment to the wing 140 is shown as BDC-POST. Without more, a first trough 155 may be created in the non-limiting example shown, from which water may not be able to get to the drain that is at BDC-PRE. A filler material 160, such as a foamed epoxy, fills the first trough 155 but is canted greater than 90° relative to a line passing through axis A and BDC-POST designated as β in FIG. 4 so that any water that would have been in the trough 155 is directed by gravity to the drain 120 at BDC-PRE. The filler material 160 acts as a ramp to direct the water to the BDC-POST.

The filler material 160 extends circumferentially between the drain 120 and the strut 150 through the BDC-POST. The angle β may vary because of the distance between the drain 120 and the strut 150 but is greater than 90°. The filler material 160 extends axially from the plate 97 to the third noise attenuation portion 115.

Similarly if the engine to be mounted is engine 20, after installation, the BDC is to the right of the drain 120 to account for the dihedral angle α. A second trough 165 is filled with filler material 160 in case the engine is to be engine 20. In this way, the engine may be used either as engine 20 or engine 21 without fear that water may not drain from troughs 155, 165 in the respective engine 20, 21. The filler materials 160 may be symmetrical on either sides of the drain 120. Moreover there is no need to have two drains. Further if a wing has a complex shape and therefore have more than on dihedral angle along its wing 140, the teachings of this invention may be used to have the engine be used along the wing as well as being used on an opposite wing by planning for the BDC-POST in each position on the wing(s).

Although this invention is described and shown by example as a fan case liner assembly 60, any duct having water leaking therein, that is subject to being rotated in more than one position during assembly, would benefit from this disclosure and is within the contemplation of this invention. One of ordinary skill in the art will also recognize that the geometry of the nacelle 65 may be changed so that the material of the nacelle 65 becomes the filler.

Although an example embodiment has disclosed, a worker of ordinary skill in the art would recognize that certain modifications would come within the scope of the claims. For example, any feature of the various examples described above may be used with any other feature of a different example. For that reason, the following claims should be studied to determine their true scope and content.

We claim:

1. A casing for installation in more than one circumferential position, said casing comprising:
   a shell into which fluid may drain,
   a pre-installation bottom dead center of said shell,
   a first post-installation bottom dead center of said shell wherein said first post-installation bottom dead center of said shell is circumferentially rotated a first number of degrees in a first direction from said pre-installation bottom dead center of said shell and,
   a first ramp disposed between said first post-installation bottom dead center of said shell and said pre-installation bottom dead center of said shell for directing fluid from said first post-installation bottom dead center of said shell to said pre-installation bottom dead center of said shell.

2. The casing of claim 1 further comprising:
   a drain disposed at said pre-installation bottom dead center of said shell.

3. The casing of claim 1 further comprising:
   a second post-installation bottom dead center of said shell wherein said second post-installation bottom dead center of said shell is circumferentially rotated a second number of degrees in a second direction from said pre-installation bottom dead center of said shell and,
   a second ramp disposed between a second post-installation bottom dead center of said shell and said pre-installation bottom dead center of said shell for directing fluid from said second post-installation bottom dead center of said shell to said pre-installation bottom dead center of said shell.

4. The casing of claim 3 wherein said first number of degrees and said second number of degrees are equal.

5. The casing of claim 1 wherein the first number of degrees equals the wing dihedral angle of an aircraft.

6. The casing of claim 1 wherein said first ramp extends beyond said first post-installation bottom dead center to a strut extending from said shell.

7. An engine for mounting on more than one position of an aircraft, said engine comprising:
   a nacelle into which fluid may drain,
   a pre-installation bottom dead center of said nacelle,
   a first post-installation bottom dead center of said nacelle wherein said first post-installation bottom dead center of said nacelle is circumferentially rotated a first number of degrees in a first direction from said pre-installation bottom dead center of said nacelle and, a first ramp disposed between said first post-installation bottom dead center of said nacelle and said pre-installation bottom dead center of said nacelle for directing fluid from said first post-installation bottom dead center of said nacelle to said pre-installation bottom dead center of said nacelle wherein said engine is mounted on a first wing.

8. The casing of claim 7 further comprising a drain disposed at said pre-installation bottom dead center of said nacelle.

9. The casing of claim 7 further comprising
a second post-installation bottom dead center of said nacelle wherein said second post-installation bottom dead center of said nacelle is circumferentially rotated a second number of degrees in a second direction from said pre-installation bottom dead center of said nacelle, and
a second ramp disposed between a second post-installation bottom dead center of said shell and said pre-installation bottom dead center of said shell for directing fluid from said second post-installation bottom dead center of said shell to said pre-installation bottom dead center of said shell wherein said engine is mounted on a second wing.

10. The casing of claim 9 wherein said first number of degrees and said second number of degrees are equal.

11. The casing of claim 9 wherein the first number of degrees equals the wing dihedral angle of an aircraft.

12. The casing of claim 9 wherein said first ramp extends beyond said first post-installation bottom dead center to a strut extending from said nacelle.

13. A nacelle for an engine mounted on more than one position of an aircraft, said nacelle comprising:
a shell into which fluid may drain,
a pre-installation bottom dead center of said nacelle,
a first post-installation bottom dead center of said shell wherein said first post-installation bottom dead center of said shell is circumferentially rotated a first number of degrees in a first direction from said pre-installation bottom dead center of said shell,
a first ramp disposed between said first post-installation bottom dead center of said nacelle and said pre-installation bottom dead center of said nacelle for directing fluid from said first post-installation bottom dead center of said nacelle to said pre-installation bottom dead center of said nacelle,
a second ramp disposed between a second post-installation bottom dead center of said shell and said pre-installation bottom dead center of said shell for directing fluid from said second post-installation bottom dead center of said shell to said pre-installation bottom dead center of said shell wherein said second post-installation bottom dead center of said nacelle is circumferentially rotated a second number of degrees in a second direction from said pre-installation bottom dead center of said nacelle, and
a drain disposed at said pre-installation bottom dead center of said nacelle for draining said fluid.

14. The nacelle of claim 13 wherein said drain is disposed within a groove in a material extending radially inwardly from said shell.

15. The nacelle of claim 14 wherein said nacelle further comprises a rub strip extending radially inwardly away from said shell and forward of said material wherein a first trough exists in said shell between said post-installation bottom dead center and said pre-installation bottom dead center wherein said first ramp fills said trough.

16. The nacelle of claim 15 wherein said first number of degrees equals the wing dihedral angle of an aircraft.

17. The nacelle of claim 13 wherein said first ramp extends beyond said first post-installation bottom dead center to a strut extending from said shell.

18. The nacelle of claim 13 wherein said drain is disposed between said first ramp and said second ramp.

19. The nacelle of claim 18 wherein said drain is disposed at said pre-installation bottom dead center.

* * * * *